US011052880B2

(12) United States Patent
Schmidt et al.

(10) Patent No.: US 11,052,880 B2
(45) Date of Patent: Jul. 6, 2021

(54) PARKING LOCK ARRANGEMENT

(71) Applicant: GKN Automotive Ltd., Birmingham (GB)

(72) Inventors: Mark Schmidt, Königswinter (DE); Simon Broicher, Hürth (DE)

(73) Assignee: GKN Automotive Ltd., Birmingham (GB)

( * ) Notice: Subject to any disclaimer, the term of this patent is extended or adjusted under 35 U.S.C. 154(b) by 0 days.

(21) Appl. No.: 16/621,319

(22) PCT Filed: Jun. 14, 2017

(86) PCT No.: PCT/EP2017/064613
§ 371 (c)(1),
(2) Date: Dec. 11, 2019

(87) PCT Pub. No.: WO2018/228686
PCT Pub. Date: Dec. 20, 2018

(65) Prior Publication Data
US 2020/0198597 A1   Jun. 25, 2020

(51) Int. Cl.
*B60T 1/00* (2006.01)
*F16H 63/34* (2006.01)
*B60T 13/74* (2006.01)

(52) U.S. Cl.
CPC .......... *B60T 1/005* (2013.01); *F16H 63/3433* (2013.01); *F16H 63/3441* (2013.01); *B60T 13/743* (2013.01)

(58) Field of Classification Search
CPC .. F16H 63/34; F16H 63/3433; F16H 63/3441; F16H 63/3491; B60T 1/005; B60T 13/743
See application file for complete search history.

(56) References Cited

U.S. PATENT DOCUMENTS

2010/0243386 A1*   9/2010   Hayashi .................. F16D 65/14
                                                            188/156
2011/0203899 A1*   8/2011   Weifels ............... F16H 63/3433
                                                            192/219.5
(Continued)

FOREIGN PATENT DOCUMENTS

DE         4447512 A1      3/1996
DE        10105637 A1      8/2002
(Continued)

OTHER PUBLICATIONS

International Search Report and Written Opinion for PCT/EP2017/064613 dated Oct. 17, 2017 (13 pages; with English translation).

*Primary Examiner* — Charles A Fox
*Assistant Examiner* — Lori Wu
(74) *Attorney, Agent, or Firm* — Bejin Bieneman PLC

(57) ABSTRACT

A parking lock arrangement for a drive train of a motor vehicle includes a controllable locking mechanism and an unlocking mechanism. The controllable locking mechanism includes a spindle drive with a spindle shaft rotationally drivable about a spindle axis, an actuator for rotating the spindle shaft and a positioning element movable by rotating the spindle shaft for actuating a blocking element. The blocking element acts at least indirectly on a drive element in a blocking or releasing manner. The unlocking mechanism includes an unlocking element and a manually operable control element. The unlocking element is movable via the control element from a normal position, in which the unlocking element is spaced apart from the spindle shaft, into an engagement position, in which the unlocking element is coupled in torque-transmitting manner to the spindle shaft for forced releasing of the locking mechanism.

15 Claims, 3 Drawing Sheets

(56) References Cited

U.S. PATENT DOCUMENTS

2017/0088111 A1\* 3/2017 Kirchner ................ F16D 66/00
2017/0307080 A1\* 10/2017 Bormann ................ B60T 1/005

FOREIGN PATENT DOCUMENTS

DE 102009023498 A1 12/2010
DE 102010029401 B4 8/2013

\* cited by examiner

PARKING LOCK ARRANGEMENT

CROSS-REFERENCE TO RELATED APPLICATIONS

This application is a national stage of, and claims priority to, Patent Cooperation Treaty Application No. PCT/EP2017/064613, filed on Jun. 14, 2017, which application is hereby incorporated herein by reference in its entirety.

BACKGROUND

Parking locks are used in vehicle drive trains to block a drive component in the drive train on demand, preventing the vehicle from unintentionally rolling away. The parking lock can also be activated in an electric drive arrangement, for example, to prevent the vehicle from unintentionally rolling away if the on-board electronics of the vehicle fail, in addition to the main task of holding the vehicle securely in the parked state. The known parking locks usually have an actuator that interacts with a blocking element that blocks or releases a drive shaft. However, in order to be able to release the blocking element again in the event of an actuator failure, for example caused by a defect in the on-board electronics, in order to be able to tow the vehicle if necessary, devices for forced releasing or emergency releasing are known.

From DE 10 2010 029 401 B4 a parking lock arrangement with a locking mechanism, an actuator and an unlocking mechanism is known. The locking mechanism comprises a blocking element that is linearly movable by the actuator and a pawl that interacts with the blocking element to block a shaft. In order to enable a forced releasing in the blocked state, the unlocking mechanism is provided, which has an unlocking element for rotating the blocking element. The blocking element has a recess in a peripheral portion into which the pawl can immerse. The unlocking element can be rotated manually using an operating lever located outside the housing. The actuating lever is connected to a Bowden cable so that in the event of failure of the electronics, the drive shaft can be released manually by actuating the Bowden cable.

DE 101 05 637 A1 contains a further parking lock arrangement with a manually operated emergency releasing device. The known parking lock arrangement has an actuating device which comprises a control element for operating a parking lock, a spring accumulator for activating the parking lock, a controllable actuator for deactivating the parking lock and a blocking device for blocking the parking lock in the deactivated state. Furthermore, a rotatably mounted main actuating lever is provided via which the spring load accumulator, the actuator and the blocking device are connected to the control element or can be brought into operative connection with it. For emergency releasing of the parking lock, a Bowden cable connected to the main operating lever is provided, which can be operated manually from a driver's compartment.

SUMMARY

The disclosure relates to a parking lock arrangement for a drive train of a motor vehicle, wherein the parking lock arrangement comprises a controllable locking mechanism for blocking a rotational movement of a drive element in the drive train of the motor vehicle, wherein the locking mechanism comprises a spindle drive with a spindle shaft rotationally drivable about a spindle axis, an actuator for rotatingly driving the spindle shaft and a positioning element movable by rotating the spindle shaft for actuating a blocking element, which acts at least indirectly on the drive element in a blocking or releasing manner, and an unlocking mechanism for forced releasing of the locking mechanism, the unlocking mechanism comprises an unlocking element for rotating the spindle shaft and a manually operable control element for operating the unlocking element. Furthermore, the disclosure relates to a drive unit, in particular for an electric drive arrangement, for driving a motor vehicle with a parking lock arrangement for blocking a rotational movement of the drive element.

As disclosed herein it is possible to provide an improved and easier to produce parking lock arrangement with forced releasing capabilities, which may also be more maintenance friendly and robust. Further disclosed is an improved and easier to manufacture drive unit with forced releasing capabilities, which may also be more maintenance-friendly and more robust.

In a parking lock arrangement of the type mentioned above, the unlocking element is movable via the control element from a normal position, the unlocking element is spaced apart from the spindle shaft, into an engagement position, and the unlocking element is coupled in torque-transmitting manner to the spindle shaft for forced releasing of the lock mechanism.

An advantage is that the unlocking mechanism is spaced from the spindle shaft during normal operation, when the locking mechanism is regularly actuated by the actuator to block and unlock the rotational movement of the drive element. Thus, in normal operation, the unlocking mechanism does not interfere with the locking mechanism and is therefore not moved when the actuator rotates the spindle shaft. Only if the actuator fails and the locking mechanism blocks the drive element, the unlocking mechanism must be connected to the locking mechanism for forced releasing thereof. For this purpose, the unlocking element is moved to the engagement position by actuating the control element, in which the unlocking element is coupled in torque-transmitting manner to the spindle shaft. Then, the spindle shaft can be turned by manually turning the unlocking element in order to move or to transfer the positioning element to an open position in which the blocking element releases the drive element again. As a result, the unlocking mechanism only engages the locking mechanism if it has to be unlocked by force. This can be the case, for example, when the on-board electronics of the vehicle fail and the actuator, in particular an electromechanical actuator for driving the spindle shaft, is not available.

The torque transmitting connection between the unlocking element and the spindle shaft established in the engagement position ensures that a rotary movement of the unlocking element causes a rotary movement of the spindle shaft about the spindle axis. For this purpose, the two components can be directly connected to each other, whereby an indirect connection via at least one other component connected in between in the torque flow is also possible in principle.

According to an embodiment, the unlocking element can be arranged rotatable about the spindle axis. Furthermore, the unlocking element can be guided movably in the direction of the spindle axis, i.e. axially. Thereby, the unlocking element can be coupled in torque-transmitting manner to the spindle shaft by moving it in the axial direction towards the spindle shaft. In addition, the unlocking element, which is arranged, in particular concentrically, to the spindle axis, provides a particularly compact parking lock arrangement, since there is no need for a direction change or the like, which could become necessary, for example, in the case of an unlocking element that is positioned obliquely to the spindle shaft or radially, i.e. perpendicularly to the spindle axis.

According to another aspect, the unlocking element can be rotatably fixedly connected to the control element. In this way, the unlocking element is always rotated when the control element is operated manually. This simplifies the process of manual forced releasing.

Preferably, the control element is configured as a control shaft. The control shaft can transmit a torque about a centre line of the control shaft as well as a force acting in the direction of the centre line. This means that the unlocking element can be easily moved to the engagement position or back to the normal position and rotated about the spindle axis via the control shaft. Preferably, the control shaft is configured to be flexible. The control shaft can then be installed in the vehicle along a curved course. For instance, the control shaft may be formed from several metal strands that are twisted to a wire rope. Furthermore, the control shaft can be guided movably in a protective tube. Movable in this context means that the control shaft inside the protective tube can be rotated around the centre line and moved in the direction of the centre line, which can be curved, in order to transmit compressive and tensile forces as well as torque. The protective tube can be configured as a flexible shell or hose. The control shaft can be coated with plastic to increase its sliding properties in the protective tube and/or its corrosion resistance. From the free longitudinal end, i.e. the longitudinal end of the control shaft remote from the unlocking element, a person, for example the driver of the motor vehicle, can carry out manual forced releasing. For this purpose, the person can exert a force on the free longitudinal end of the control shaft, in particular a compressive force acting in the running direction of the control shaft, in order to bring the unlocking element into the engagement position. The person can then rotate the control shaft around its centerline to rotate the remote unlocking element. In the installed state of the parking lock arrangement in the motor vehicle, the control shaft can be guided, for example, into a luggage compartment, or interior, or engine compartment of the motor vehicle in order to improve the accessibility of the free longitudinal end of the control shaft for manual forced releasing.

Furthermore, a guide element, for instance a cable duct, may be provided through which the free longitudinal end of the control element, in particular the control shaft, is guided. The guide element can be inserted into a receptacle, in particular a bore in a motor vehicle component, for example a trunk trim. Furthermore, the protective tube can be supported axially against the guide element. Furthermore, the protective tube can be axially supported at the opposite longitudinal end on a housing of the parking lock arrangement or the drive unit. The protective tube, thus, provides a stable shell in the running direction of the control shaft in order to transmit mechanical movement or compressive or tensile forces and torques via the movably guided control element. In particular, a handle, for example a disc-shaped knob, may be arranged at the free longitudinal end of the control shaft remote from the unlocking element. Preferably, the unlocking element is moved into the engagement position by pressing down the handle or by applying a pressure force to the handle in the direction of the centre line of the control element. By manually turning the pressed handle, the torque can then be transmitted via the control shaft to the unlocking element to rotate the spindle shaft around the spindle axis. By applying a tensile force to the handle, the unlocking element can be returned to its normal position. Preferably, the unlocking mechanism comprise spring means for this purpose, which resiliently biases the unlocking element towards the normal position. In particular, the spring means are supported between the handle on the one hand and the guide element, in particular the cable duct, on the other hand. In this way, the unlocking element is always returned to the normal position and is only moved to the engagement position when the handle is actuated manually by exerting a compressive force which counteracts the spring force. In principle, the handle can also be retracted manually. In addition, the handle, which can be configured as a knob, can comprise a knurl profile to simplify operation. Furthermore, the handle can comprise an inner profile or an outer profile to allow the force and torque to be applied using a tool attached to the handle, such as a screwdriver, ratchet screwdriver, wrench or the like.

Furthermore, the unlocking element may have a sleeve-shaped connecting portion into which the control element, for instance the control shaft, extends. In particular, the unlocking element may comprise a plastic sleeve comprising the connecting portion. The plastic sleeve can be positively connected with or injection moulded onto the control element along the connecting portion. In this way, the unlocking element can be permanently connected to the control element so that the two components can only be separated from each other by destruction.

According to an embodiment, the unlocking element can comprise a first positive-locking element and the locking mechanism can comprise a second positive-locking element, which is configured to correspond to the first positive-locking element and is coupled in torque-transmitting manner to the spindle shaft. In the engagement position, the first positive-locking element and the second positive-locking element are connected to each other in a positive-locking manner and/or engage each other. The first positive-locking element can have an inner profile or an outer profile, for example an inner or outer hexagonal profile. Accordingly, the second positive-locking element may have a profile that is opposite to the profile of the first positive-locking element with an outer profile or an inner profile. It goes without saying that as an alternative to the hexagonal profile, other profiles, such as a square, pentagonal or Torx profile, are also conceivable to enable a detachable and torque-transmitting positive-locking and/or plug-in connection. Preferably, the first positive-locking element is connected to the control element in a torque-proof manner. For this purpose, the first positive-locking element can be arranged at the longitudinal end of the connecting portion of the unlocking element facing the spindle shaft. As an alternative to the rotationally fixed connection, the unlocking element can have a coupling acting in only one direction of rotation, so that the first positive-locking element can transmit the torque introduced via the control element to the spindle shaft in a rotary motion, analogous to the function of a ratchet screwdriver.

Preferably, the second positive-locking element is formed at a longitudinal end of the spindle shaft remote from the actuator. In particular, the second positive-locking element can be arranged on one end face of a free longitudinal end of the spindle shaft. For example, the second positive-locking element can be an outer or inner plug-in profile formed on the free longitudinal end of the spindle shaft. The first positive-locking element can be brought into engagement with the second positive-locking element by transferring it axially into the engagement position, for example by pushing the first positive-locking element onto the second positive-locking element. In this case, the unlocking element is directly connected to the spindle shaft in the engagement position, providing a particularly robust and compact parking lock arrangement. It is also possible that the second positive-locking element is formed on a rotor shaft of the electromechanical actuator in particular, which is connected to the spindle shaft. For example, the rotor shaft of the actuator may protrude from an actuator housing at both longitudinal ends, with a first longitudinal end of the rotor shaft coupled to the spindle shaft and a second longitudinal end of the rotor shaft serving as a joint for the unlocking element to transmit torque to the spindle shaft via the rotor shaft in the engagement position. Correspondingly, second positive-locking element could be arranged at and/or integrally formed with the rotor shaft.

In order to easily replace the actuator in the event of its defect, the parking lock arrangement can have two structurally separate shafts, namely the rotor shaft and the spindle shaft. In principle, however, the parking lock arrangement can also have only one continuous motor shaft, which comprises a spindle shaft portion for the spindle drive and a rotor shaft portion rotatably mounted in the actuator. As an alternative to the preferred embodiment of the actuator as an electromechanical drive, the actuator can also be a hydraulically or pneumatically actuated drive to rotate the spindle shaft.

Preferably, the positioning element is transferable into an open position, in which the blocking element is in a releasing position, in which the drive element can be rotated, and into a closed position, in which the blocking element is in a blocking position, in which the blocking element blocks the rotary movement of the drive element. The spindle drive moves the positioning element preferably only axially. Thus, the open position can be a first axial position and the closed position a second axial position. Furthermore, the positioning element can be arranged on the spindle shaft, in particular arranged movably on the spindle shaft. In addition, the spindle drive may have a spindle nut held rotationally fixed on the spindle shaft. The positioning element can, then, support itself on the spindle nut with a first outer surface, for instance a collar, facing the actuator. In addition, the locking mechanism can have a return spring which resiliently biases the positioning element towards the closed position. The return spring can be supported on a second outer surface opposite the first outer surface or on a bottom side of the positioning element. Advantageously, the return spring is arranged radially outside of the unlocking element.

The present disclosure describes a drive unit, in particular a drive unit for an electric drive arrangement, for driving a motor vehicle with the parking lock arrangement described above. With the drive unit, the same advantages result as with the parking lock arrangement, and vice versa.

The drive unit comprises a drive element of the motor vehicle, the rotation of which can be blocked by means of the parking lock arrangement. Furthermore, the drive unit comprises a housing or a housing arrangement in which the drive element is rotatably mounted. In principle, the drive element can be any torque-transmitting component arranged in the drive train between the drive unit and the wheels of the motor vehicle. The drive element can be a drive shaft, a gear shaft or another component that transmits torque to the wheels, such as a differential basket of a differential gear or a component of a brake. In order to have a locking effect on the wheels of the motor vehicle, merely a direct torque-transmitting connection with the wheels is needed. The locking mechanism is preferably also located in the housing in which the drive element to be blocked is arranged or mounted. In addition, the drive unit may, in known manner, comprise a drive motor, in particular an electric machine for driving the drive element and/or a reduction gear and/or a differential gear.

With respect to the unlocking mechanism, at least the unlocking element is housed or arranged in the housing in which the locking mechanism is also arranged. To enable manual operation of the unlocking element located inside the housing from the outside, the control element can be guided outwards through a housing bore of the housing.

BRIEF DESCRIPTION OF THE DRAWINGS

An embodiment is explained below using the drawing figures, which show.

DETAILED DESCRIPTION

Figure 1:
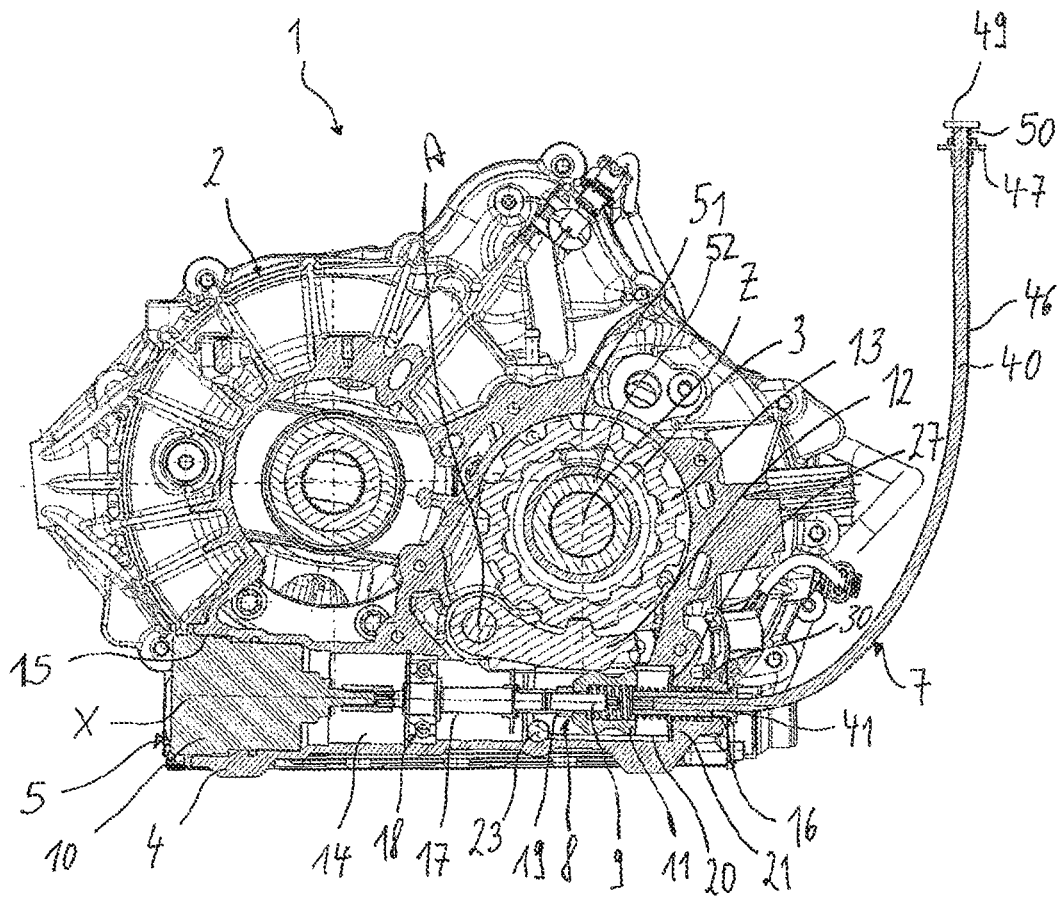
FIG. 1 illustrates a drive unit with a parking lock arrangement according to an embodiment of the disclosure in cross-sectional view.

FIG. 1 shows a drive unit 1 for driving a motor vehicle. The drive unit 1 comprises, in a manner known per se, an electric drive 2 with an electric machine and a reduction transmission connected to the electric machine for transmitting torque as well as a differential transmission connected to the reduction transmission for transmitting torque. The electric drive 2 may, for example, be configured to drive a rotary shaft of the motor vehicle as the sole drive of that rotating shaft. Besides that, a further rotating shaft of the motor vehicle can be provided, which is driven by another drive unit with a separate drive source, for example a combustion engine or another electric machine.

The electric drive 2 rotatingly drives a drive element, here in the form of a drive shaft 3, which defines an axis of rotation Z. The drive shaft 3 is arranged in the torque flow between the electric motor and the rotating shaft of the motor vehicle driven by the electric motor. In addition, the drive unit 1 comprises a housing 4 in which the drive shaft 3 is rotatably mounted.

To selectively block or release a rotary movement of the drive shaft 3, drive unit 1 comprises an inventive parking lock arrangement 5. The latter comprises a controllable locking mechanism 6 for blocking or releasing the rotational movement of the drive shaft 3 and an unlocking mechanism 7 for manual emergency release of the locking mechanism 6.

Figure 2:
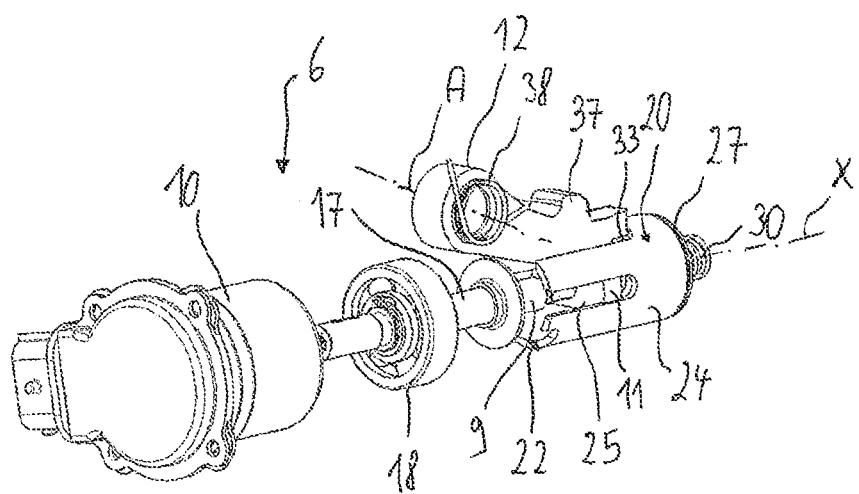
FIG. 2 illustrates a locking mechanism of the parking lock arrangement in exploded view.

FIG. 2 shows the locking mechanism 6 detached from other components of the parking lock arrangement 5 or other components of the drive unit 1. The controllable locking mechanism 6 comprises a spindle drive 8 with a spindle shaft 9 drivable in rotation about a spindle axis X, an actuator 10 for rotatingly driving the spindle shaft 9, an positioning element 11 movable by rotation of the spindle shaft 9, a blocking element 12 cooperating with the positioning element 11, and a parking lock wheel 13 rotatably fixed connected to the drive shaft 3, on which the blocking element 12 acts in blocking or releasing manner. The parking lock wheel 13 can be connected rotatably fixed to the drive shaft 3 in any known way. For example, the parking lock wheel 13 can be positively connected to the drive shaft 3, in particular by means of splines, or materially connected, in particular by means of welding. Here, the parking lock wheel 13 is cranked, i.e. the radially outer ring portion is axially offset from the connecting portion with the shaft 3. Coaxially to the drive shaft 3, a bearing 52 is shown with which the shaft is rotatably mounted within the housing 4. The locking mechanism 6 is housed together with the drive shaft 3 in the housing 4.

FIG. 1 shows that below the drive shaft 3 there is arranged an elongated receiving space 14 in the housing 4 which is accessible from the outside through a first housing bore 15 and a second housing bore 16 opposite the first housing bore 15. The main extend of the mounting space 15 runs transversely to the axis of rotation Z.

The actuator 10 is inserted from the outside through the first housing bore 15 into the receiving space 14 and can be screwed to the housing 4. Preferably, the actuator 10 is configured as an electromechanical actuator and can be controlled by an electronic control unit (not shown). It is understood, however, that the actuator 10 can also have alternative embodiments, for example in the form of a hydraulic or pneumatic actuator. The actuator 10 rotatably drives the spindle shaft 9. The actuator 10 comprises an inner rotor shaft which is connected to the spindle shaft 9 via a coupling 17. Furthermore, a roller bearing 18 is arranged in the receiving space 14 of the housing 4, which rotates the spindle shaft 9. The spindle shaft 9 and the rotor shaft are arranged concentrically to each other and rotatable about the spindle axis X. The spindle axis X is radially spaced from the axis of rotation Z and aligned transversely to it. The main extend of the receiving space 14 runs parallel to the spindle axis X.

The spindle drive 8 also comprises a push member, here a spindle nut 19, which interacts with the positioning element 11. The spindle nut 19 is supported radially on the outside by a spindle sleeve 20 so that the spindle nut 19 is held rotationally fixed and guided linearly movable on the spindle shaft 9. For this purpose, the spindle sleeve 20 is of hollow cylindrical configuration and is particularly arranged concentrically to the spindle axis X. The spindle sleeve 20 is supported axially on a housing wall 21 of the housing 4 with one end facing away from the actuator 10. The opposite end face of the spindle sleeve 20 facing the actuator 10 has a recess 22 into which a locking device supported on the housing 4, in this case a locking pin 23, extends. Thus, the spindle sleeve 20 is fixed between the housing wall 21 and the locking pin 23 in the housing 4. Furthermore, the spindle sleeve 20 has a cylindrical lateral surface 24, which has a longitudinal slot 25 on each of two diametrically opposite sides. The two longitudinal slots 25 extend parallel to the spindle axis X along the displacement path of the spindle nut 19 and are open on the side of the spindle sleeve 20 facing the actuator 10. The spindle nut 19 extends into the two longitudinal slots 25 and is supported radially on the lateral surface 24 of the spindle sleeve 20. When the actuator 10 is actuated in a first direction of rotation, the spindle nut 19 on the spindle shaft 9 moves towards the housing wall 21, i.e. away from the actuator 10. When the actuator 10 is actuated in a second direction of rotation, the spindle nut 19 on the spindle shaft 9 moves towards the actuator 10.

Figure 3:
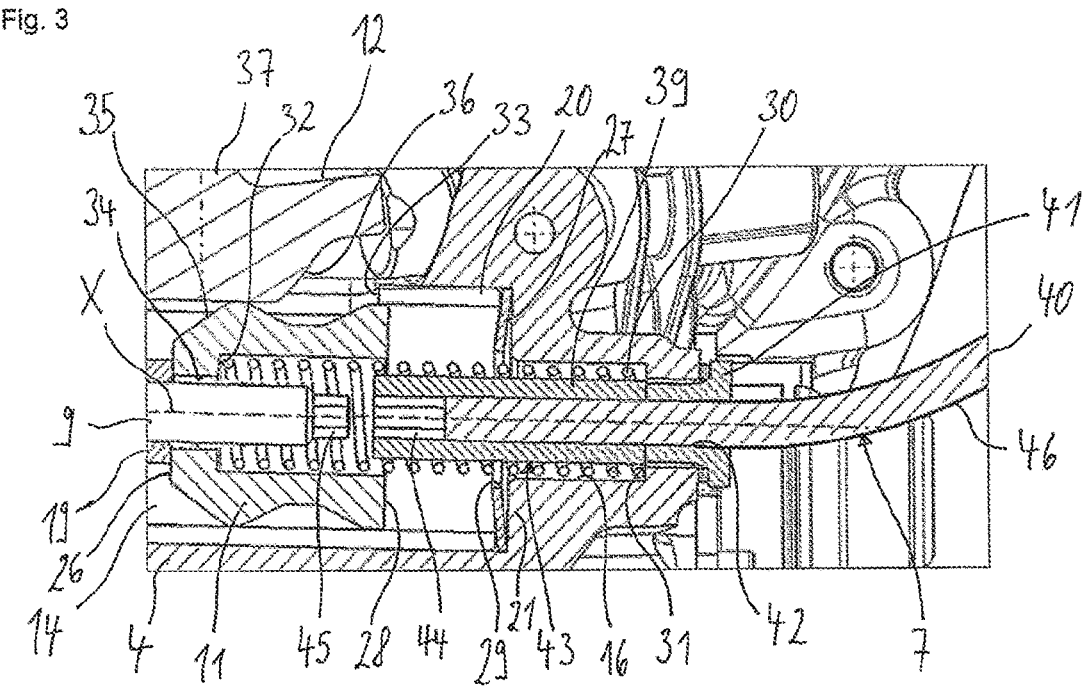
FIG. 3 illustrates an enlarged partial section of the drive unit of FIG. 1, wherein the locking mechanism is shown in a closed position and an unlocking mechanism is shown in a normal position.
Figure 6:
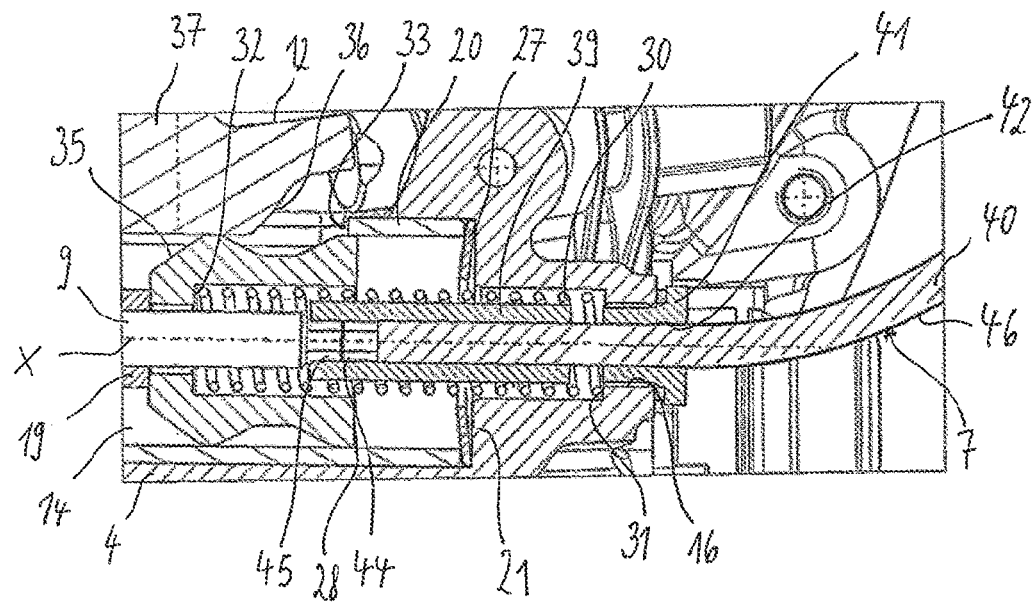
FIG. 6 illustrates an enlarged partial section of the drive unit of FIG. 1, wherein the locking mechanism is shown in a closed position and an unlocking mechanism is shown in an engagement position.
Figure 7:
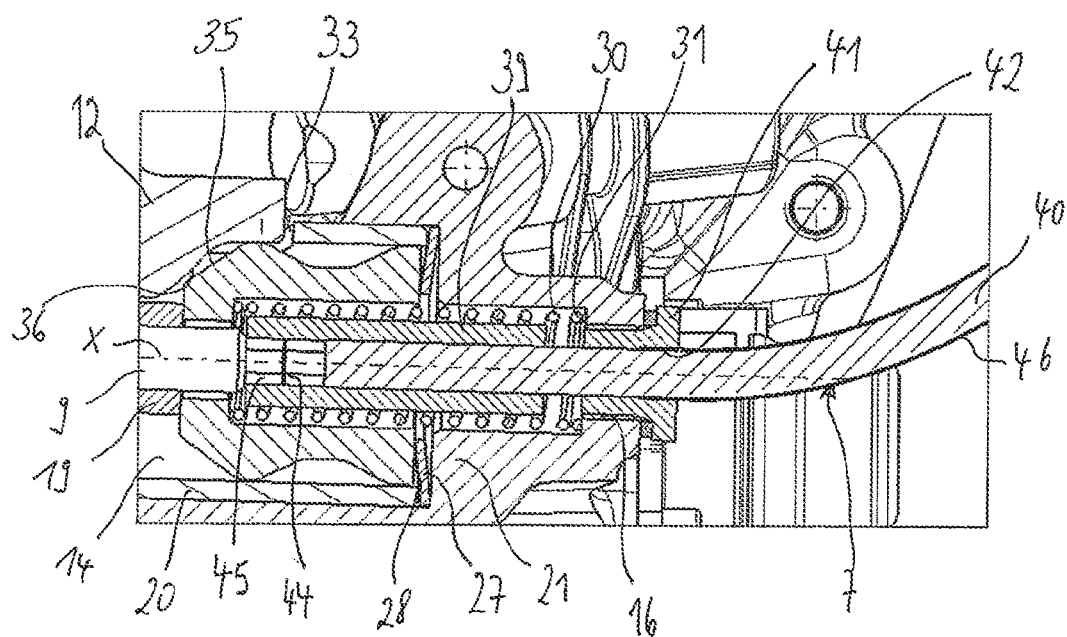
FIG. 7 illustrates an enlarged partial section of the drive unit of FIG. 1, wherein the parking lock arrangement is shown in an emergency released position.

The positioning element 11 is located inside the spindle sleeve 20, wherein the positioning element 11, as shown in FIG. 2, may be supported within the spindle sleeve 20. For this purpose, the positioning element 11 may extend at least into one of the two longitudinal slots 25 of the spindle sleeve 20, in particular into the two longitudinal slots 25, in order to support itself on the spindle sleeve 20. Due to the longitudinal slots 25 extending parallel to the spindle axis X, the positioning element 11 can be moved linearly relative to the spindle shaft 9. Furthermore, the positioning element 11 has a circumferential collar 26 on one side facing the actuator 10, which supports the positioning element 11 axially on the spindle nut 19. When the actuator 10 is actuated in the first direction of rotation, the spindle shaft 9 is rotatably driven. Due to the rotary movement of the spindle shaft 9 in the first direction of rotation, the spindle nut 19 pushes the positioning element 11 away from the actuator 10 towards an open position. FIG. 7 shows the locking mechanism 6 in the open position, in which the blocking element 12 is in a releasing position, in which the drive shaft 3 can be rotated. Between the spindle sleeve 20 and the housing wall 21, there is a damping element, here a disc spring 27, on which one end surface 28 of the positioning element 11 is axially supported in the open position. The disc spring 27 has a central opening 29 arranged concentrically to the second housing bore 16. Through this opening 29 extends a return means, here in the form of a helical compression spring 30, which resiliently biases the positioning element 11 towards the actuator 10. When actuator 10 is actuated in the second direction of rotation, the spindle shaft 9 is rotatably driven. Due to the rotational movement of the spindle shaft 9 in the second direction of rotation, the spindle nut 19 on the spindle shaft 9 moves towards the actuator 10. The positioning element 11, which only rests loosely on the spindle nut 19, is reset towards a closed position merely by the helical compression spring 30. FIGS. 3 and 6 show the positioning element 11 in the closed position, in which the blocking element 12 is in a blocked position, in which the blocking element 12 blocks the rotary movement of the drive shaft 3. In detail, the helical compression spring 30 is arranged concentrically to the spindle axis X and is supported axially by a first spring end on an annular shoulder 31 formed in the second housing bore 16. An opposite second spring end extends through a central opening in the end surface 28 of the positioning element 11 into the latter and is supported axially on a bottom side 32 of the positioning element 11 remote from the actuator 10.

In addition, the positioning element 11 interacts with the blocking element 12. For this purpose, the spindle sleeve 20 has a longitudinal recess 33 through which the blocking element 12 arranged outside the spindle sleeve 20 can engage in the spindle sleeve 20. The longitudinal recess 33 is formed in the lateral surface 24 of the spindle sleeve 20 with the same distance between the two longitudinal slots 25 and also extends parallel to the spindle axis X. The longitudinal recess 33 is formed in the lateral surface 24 of the spindle sleeve 20 with the same distance between the two longitudinal slots 25. The longitudinal recess 33 is open at the end facing the actuator 10. The positioning element 11 is sleeve-shaped and has a central through-hole 34 in the bottom side 32, through which the spindle shaft 9 extends. Radially outside the collar 26, the positioning element 11 has a working surface 35 which interacts with a corresponding mating surface 36 of the blocking element 12 when the locking mechanism 6 is actuated. The blocking element 12 is configured as a pawl, which is mounted at one end around a pivot axis A. The pivot axis A is aligned parallel to the rotational axis Z. At its opposite free end, the blocking element 12 has on the outside the mating surface 36, which can be loaded by the working surface 35 of the positioning element 11, and on the inside a locking tooth 37 for fixing the parking lock wheel 13, which is rotatably fixed connected to the drive shaft 3. The surfaces 35, 36 are configured such that a translatory movement of the positioning element 11 along the spindle axis X causes a displacement of the blocking element 12 in the direction of the axis of rotation Z. In particular, the working surface 35 of the positioning element 11 can be conical, although it is understood that this could also be spherical. The mating surface 36 is arranged at an angle to a plane containing the axis of rotation Z of the drive shaft 3 and runs through the contact point between the working surface 35 and the mating surface 36. Furthermore, a torsion spring 38 with two stirrup ends is provided, which is arranged concentrically to the pivot axis A. A first spring end of the torsion spring 38 is supported on the housing 4 and a second spring end is supported on the blocking element 12 so that the blocking element 12 is resiliently biased into a releasing position in which the locking tooth 37 and the parking lock wheel 13 are disengaged.

When the actuator 10 is actuated in the second direction of rotation, the spindle nut 19 on spindle shaft 9 moves towards the actuator 10 and the helical compression spring 30 returns the positioning element 11 to the closed position against the spring force of the torsion spring 38. FIGS. 3 and 6 show the positioning element 11 in the closed position, in which the blocking element 12 is in the blocked position, in which the blocking element 12 blocks the rotation of the drive shaft 3. When the actuator 10 is actuated in the first direction of rotation, the spindle nut 19 pushes the positioning element 11 away from actuator 10 towards the open position, whereby the helical compression spring 30 is biased. The torsion spring 38 pushes the blocking element 12 towards the releasing position, whereby the blocking element 12 is transferred to the releasing position as soon as the mating surface 36 can slide off the working surface 35 of the positioning element 11. FIG. 7 shows the locking mechanism 6 in the open position, in which the blocking element 12 is in the releasing position, in which the drive shaft 3 can be rotated.

In order to enable forced releasing or manual emergency releasing of the locking mechanism 6 in the event of an actuator 10 failure, the unlocking mechanism 7 has an unlocking element 39 for turning the spindle shaft 9 and a manually operated control element 40 for actuating the unlocking element 39. The unlocking element 39 can be moved by means of the control element 40 from a normal position, in which the unlocking element 39 is spaced from the spindle shaft 9, to an engagement position, in which the unlocking element 39 is coupled in torque-transmitting manner to the spindle shaft 9 for the forced releasing of the locking mechanism 6, and vice versa. The unlocking element 39 is shown in FIG. 3 in the normal position and in FIGS. 6 and 7 in the engagement position.

The sleeve-shaped unlocking element 39 is arranged in housing 4 and, here, as a hollow cylindrical plastic sleeve. In particular, the unlocking element 39 is arranged concentrically to the helical compression spring 30, wherein the helical compression spring 30 radially encloses the unlocking element 39. The unlocking element 39 is arranged such that it can move parallel to the spindle axis X and extends into the second housing bore 16. An outer diameter of the unlocking element 39 is at least slightly smaller than an inner diameter of the annular shoulder 31 of the housing 4 in order to be able to insert the unlocking element 39 into the housing 4 via the second housing bore 16. In the second housing bore 16, a cable duct 41 is inserted in a positive-locking manner, wherein the cable duct 41 is flush with the shoulder 31 and axially limits the mobility of the unlocking element 39. FIG. 3 shows that in the normal position the unlocking element 39 is arranged at least about halfway inside the second housing bore 16.

The control element 40 is led from the outside into the housing 4 through a central passage opening 42 of the cable duct 41. FIG. 1 shows that more than half, in particular about 70% to 90%, of the control element 40 is located outside the housing 4. The unlocking member 39 has a sleeve-shaped connecting portion 43, wherein the control element 40 extends into the connecting portion 43. The inner diameter of the connecting portion 43 corresponds at least approximately to an inner diameter of the passage opening 42 of the cable duct 41. For a firm connection with the control element 40, the unlocking element 39, which is formed as a plastic sleeve, is injection moulded onto the control element 40 at the connecting portion 43.

A first positive-locking element 44 is formed on a longitudinal end of the unlocking element 39 facing the spindle shaft 9. A second positive-locking element 45 is arranged axially opposite the first positive-locking element 44, namely at a longitudinal end of the spindle shaft 9 facing the unlocking element 39. The second positive-locking element 45 is configured to correspond to the first positive-locking element 44 and is torque-transmittingly connected to the spindle shaft 9. The first positive-locking element 44 is configured, here, as an inner profile and the second positive-locking element 45 as an opposing outer profile, whereby a reverse configuration would also be possible. The first positive-locking element 44, here, has an inner hexagonal profile and the second positive-locking element 45, here, has an outer hexagonal profile. It goes without saying, however, that as an alternative to the hexagonal profile, other profiles, for example a square, pentagonal or Torx profile, would also be possible in order to be able to provide a detachable and torque-transmitting positive-locking or plug-in connection between the two positive-locking elements 44, 45.

The control element 40 is configured as a flexible control shaft which is formed from several metal strands, for instance steel strands, being twisted to a wire rope. The flexible control shaft 40 is movably guided in a protective tube, here in a flexible casing 46. The casing 46 is supported axially at one end of the cable duct 41 facing the housing 4. For this purpose, the casing 46 is at least partially inserted together with the control shaft 40 into the passage opening 42 of the cable duct 41. At the opposite end of the casing 46, facing away from the housing 4, it is axially supported by a further cable duct 47. The casing 46 encloses the portion of the control shaft 40 located outside the housing 4 and is configured stable in the direction of the control shaft 40, so that mechanical movements such as compressive and tensile forces as well as torque, can be transmitted via the flexible control shaft 40 guided in the casing 46.

Figure 4:
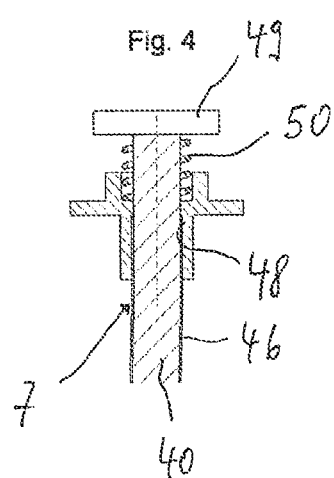
FIG. 4 illustrates an enlarged partial section of the unlocking mechanism in the normal position.

The additional cable duct 47 can be inserted into a bore in a motor vehicle component of the motor vehicle, for example into a bore in a trunk coverage of a motor vehicle equipped with the parking lock arrangement 5. The control shaft 40 is led through a central opening 48 of the other cable duct 47. At the free longitudinal end of the control shaft 40, which is led through the additional cable duct 47, a rotary knob 49 is arranged to simplify the manual actuation of the control shaft 40. The unlocking mechanism 7 also has spring means 50, here in the form of a helical compression spring, which are supported between the rotary knob 49 and the cable duct 47. In this way, the unlocking element 39 is resiliently biased towards the normal position in which the unlocking element 39 is spaced from the spindle shaft 9. The rotary knob 49 is shown in FIG. 4 in the normal position and in FIG. 5 in the engagement position.

In regular operation of the parking lock arrangement 5, the locking mechanism 6 is operated by actuator 10, so that the parking lock can be activated and deactivated by the rotary movements generated by the actuator 10. In the open position of the locking mechanism 6, the positioning element 11 is in contact with the disc spring 27 with the end surface 28. When the parking lock arrangement 5 is activated to prevent the vehicle from rolling away in a parking position, the actuator 10 receives an appropriate electronic signal from the control unit. The actuator 10, then, turns in the second direction to move the spindle nut 19 on the spindle shaft 9 towards the actuator 10. The positioning element 11, which is only loosely attached to the spindle nut 19, is returned and/or adjusted to the spindle nut 19 by the helical compression spring 30, which is biased in the open position. The translatory movement of the positioning element 11 along the spindle axis X causes a pivot movement of the blocking element 12 about the pivot axis A into the locking position in which the torsion spring 38 is biased. In the blocking position, the locking tooth 37 engages in one of several detent recesses 51 of the parking lock wheel 13 and blocks the rotary movement of the drive shaft 3. In the now activated state of the parking lock arrangement 5, the locking mechanism 6 is in the closed position shown in FIG. 3. In contrast, the unlocking mechanism 7 remains in the normal position also shown in FIG. 3 during normal operation of the parking lock arrangement 5.

Figure 5:
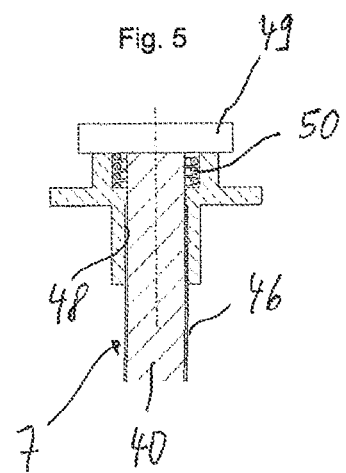
FIG. 5 illustrates an enlarged partial section of the unlocking mechanism in the engagement position.

In the following sequence, two scenarios are possible for opening the blocked parking lock arrangement 5. If the actuator 10 is not available for rotating the spindle shaft 9, the rotary motion of the blocked drive shaft 3 can be force released by means of the unlocking mechanism 7. For this purpose, the spindle shaft 9 is turned manually in the first direction of rotation by means of the unlocking mechanism 7. The rotary knob 49 is manually pressed down against the other cable duct 47, starting from the normal position of the rotary knob 49, shown in FIG. 4. Herein, the spring 50 is biased. The manually applied compression force is transmitted via the control shaft 40 to the unlocking element 39, which is transferred from the normal position shown in FIG. 3 to the engagement position shown in FIG. 6. In the engagement position, the unlocking element 39 is moved axially in the direction of the spindle shaft 9 and is correspondingly spaced from the shoulder 31 of the stepped second housing bore 16. The unlocking element 39 is pushed onto the spindle shaft 9 so that the first positive-locking element 44 and the second positive-locking element 45 engage and provide a torque transmitting connection between the unlocking element 39 and the spindle shaft 9. The rotary knob 49 is then turned manually in the first direction of rotation, whereby the torque is transmitted to the spindle shaft 9 via the control shaft 40 and the unlocking element 39. Then, the spindle nut 19 on the spindle shaft 9 moves towards the housing wall 21 and pushes the positioning element 11 on the spindle shaft 9 up to the disc spring 27 into the open position. The helical compression spring 30 is biased. As soon as the mating surface 36 of the blocking element 12 can slide off the working surface 35 of the positioning element 11, the blocking element 12 is pivoted into the releasing position by the biased torsion spring 38, and the locking tooth 37 is disengaged. When the parking lock arrangement 5 is now deactivated, the locking mechanism 6 is in the released position shown in FIG. 7. The unlocking mechanism 7 is in the state shown in FIG. 7 in an emergency released position in which the rotary knob 49 is still pressed down, as shown in FIG. 5. As soon as the rotary knob 49 is released, the rotary knob 49, which is spring-loaded towards the normal position, returns to the normal position, shown in FIG. 4. Herein, the control shaft 40 pulls the unlocking element 39 into the normal position and disengages the first positive-locking element 44 and the second positive-locking element 45. In the now deactivated state of the parking lock arrangement 5, the locking mechanism 6 is again in the released position in which the rotary movement of the drive shaft 3 is released.

However, if the actuator 10 is available for releasing the parking lock arrangement 5, the unlocking mechanism 7 is not required. Instead, the unlocking mechanism 7 remains in the normal position during regular operation of the parking lock arrangement 5, in which the unlocking element 39 is at a distance from the spindle shaft 9. To release the parking lock, the parking lock control unit transmits a corresponding electronic signal to the actuator 10, which then rotates in the first direction. Then, the spindle nut 19 on the spindle shaft 9 moves towards the housing wall 21 and pushes the positioning element 11 on the spindle shaft 9 up to the disc spring 27 into the released position. Herein, the helical compression spring 30 is biased. As soon as the mating surface 36 of the blocking element 12 can slide off the working surface 35 of the positioning element 11, the blocking element 12 is pivoted into the releasing position by the biased torsion spring 38, and the locking tooth 37 is disengaged. In the now deactivated state of the parking lock arrangement 5, the locking mechanism 6 is in the released position and the unlocking element 39 remains in the normal position at a distance from the spindle shaft 9.

REFERENCE SIGN LIST 1 drive unit
2 electric drive
3 drive shaft
4 housing
5 parking lock arrangement
6 locking mechanism
7 unlocking mechanism
8 spindle drive
9 spindle shaft
10 actuator
11 positioning element
12 blocking element
13 parking lock wheel
14 receiving space
15 first housing bore
16 second housing bore
17 coupling
18 roller bearing
19 spindle nut
20 spindle sleeve
21 housing wall
22 recess
23 locking pin
24 lateral surface
25 longitudinal slot
26 collar 27 disc spring
28 end surface
29 opening
30 helical compression spring
31 shoulder
32 bottom side
33 longitudinal recess
34 through-hole
35 working surface
36 mating surface
37 locking tooth
38 torsion spring
39 unlocking element
40 control shaft
41 cable duct
42 passage opening
43 connecting portion
44 first positive-locking element
45 second positive-locking element
46 casing
47 cable duct
48 central opening
49 rotary knob
50 spring means
51 detent recess
52 bearing
A pivot axis
X spindle axis
Z axis of rotation

The invention claimed is:

1. A parking lock arrangement for a drive train of a motor vehicle, wherein the parking lock arrangement comprises:
   a controllable locking mechanism for blocking a rotational movement of a drive element in the drive train of the motor vehicle, wherein the locking mechanism includes a spindle drive with a spindle shaft rotationally drivable about a spindle axis, an actuator for rotatingly driving the spindle shaft and a positioning element movable by rotating the spindle shaft for actuating a blocking element, which acts at least indirectly on the drive element in a blocking or releasing manner, and
   an unlocking mechanism for forced releasing of the locking mechanism, the unlocking mechanism including an unlocking element for rotating the spindle shaft and a manually operable control element for operating the unlocking element,
   wherein the unlocking element is movable via the control element from a normal position, in which the unlocking element is spaced apart from the spindle shaft, into an engagement position, in which the unlocking element is coupled in torque-transmitting manner to the spindle shaft for forced releasing of the locking mechanism;
   wherein the unlocking element is arranged rotatably about the spindle axis and is guided movably in the direction of the spindle axis.

2. The parking lock arrangement according to claim 1, wherein the unlocking element is rotatably fixedly connected to the control element.

3. The parking lock arrangement according to claim 1, wherein the control element is a control shaft.

4. The parking lock arrangement according to claim 1, wherein the unlocking mechanism includes spring means resiliently biasing the unlocking element towards the normal position.

5. The parking lock arrangement according to claim 1, wherein the unlocking element includes a sleeve-shaped connecting portion, the control element extends into the connecting portion.

6. The parking lock arrangement according to claim 1, wherein the unlocking element includes a first positive-locking element, and wherein the locking mechanism includes a second positive-locking element, which is configured correspondingly to the first positive-locking element and is coupled in torque-transmitting manner to the spindle shaft.

7. The parking lock arrangement according to claim 6, wherein the first positive-locking element includes an inner profile or an outer profile, and wherein the second positive-locking element includes an oppositely shaped profile.

8. The parking lock arrangement according to claim 6, wherein the first positive-locking element is rotatably fixedly connected to the control element.

9. The parking lock arrangement according to claim 6, wherein the second positive-locking element is arranged at a longitudinal end of the spindle shaft remote from the actuator.

10. The parking lock arrangement according to claim 1, wherein the positioning element is transferable into an open position, in which the blocking element is in a releasing position, in which the drive element can be rotated, and wherein the control element is transferable into a closed position, in which the blocking element is in a blocking position, in which the blocking element blocks the rotary movement of the drive element.

11. The parking lock arrangement according to claim 1, wherein the locking mechanism includes a return spring resiliently biasing the positioning element towards the closed position.

12. The parking lock arrangement according to claim 11, wherein the return spring is arranged radially outside the unlocking element.

13. The parking lock arrangement according to claim 11, wherein the spindle drive includes a spindle nut, which is held rotationally fixed on the spindle shaft, wherein the positioning element is supported with a first outer surface facing the actuator on the spindle nut, and wherein the return spring is supported on a second outer surface of the positioning element being opposite the first outer surface.

14. A drive unit for driving a motor vehicle, comprising:
   a drive element of the motor vehicle,
   a housing, in which the drive element is rotatably mounted, and
   a parking lock arrangement for blocking a rotational movement of the drive element, wherein the parking lock arrangement is arranged in the housing, and wherein the parking lock arrangement includes:
      a controllable locking mechanism for blocking a rotational movement of a drive element in the drive train of the motor vehicle, wherein the locking mechanism includes a spindle drive with a spindle shaft rotationally drivable about a spindle axis, an actuator for rotatingly driving the spindle shaft and a positioning element movable by rotating the spindle shaft for actuating a blocking element, which acts at least indirectly on the drive element in a blocking or releasing manner, and
      an unlocking mechanism for forced releasing of the locking mechanism, the unlocking mechanism including an unlocking element for rotating the spindle shaft and a manually operable control element for operating the unlocking element, wherein the unlocking element is movable via the control element from a normal position, in which the unlocking element is spaced apart from the spindle shaft, into an engagement position, in which the unlocking element is coupled in torque-transmitting manner to the spindle shaft for forced releasing of the locking mechanism;

wherein the unlocking element is arranged rotatably about the spindle axis and is guided movably in the direction of the spindle axis.

15. A parking lock arrangement for a drive train of a motor vehicle, wherein the parking lock arrangement comprises:

a controllable locking mechanism for blocking a rotational movement of a drive element in the drive train of the motor vehicle, wherein the locking mechanism includes a spindle drive with a spindle shaft rotationally drivable about a spindle axis, an actuator for rotationally driving the spindle shaft and a positioning element movable by rotating the spindle shaft for actuating a blocking element, which acts at least indirectly on the drive element in a blocking or releasing manner, and an unlocking mechanism for forced releasing of the locking mechanism, the unlocking mechanism including an unlocking element for rotating the spindle shaft and a manually operable control element for operating the unlocking element, wherein the unlocking element is movable via the control element from a normal position, in which the unlocking element is spaced apart from the spindle shaft, into an engagement position, in which the unlocking element is coupled in torque-transmitting manner to the spindle shaft for forced releasing of the locking mechanism;

wherein the locking mechanism includes a return spring resiliently biasing the positioning element towards the closed position;

wherein the return spring is arranged radially outside the unlocking element.

* * * * *